(12) United States Patent
Song et al.

(10) Patent No.: US 7,257,326 B2
(45) Date of Patent: Aug. 14, 2007

(54) METHOD FOR ALLOCATING BANDWIDTH FOR VOICE SERVICE IN A GIGABIT ETHERNET PASSIVE OPTICAL NETWORK

(75) Inventors: Jae-Yeon Song, Seongnam-si (KR); Jin-Hee Kim, Suwon-si (KR); A-Jung Kim, Seoul (KR); Min-Hyo Lee, Suwon-si (KR); Su-Hyung Kim, Seoul (KR); Se-Youn Lim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 582 days.

(21) Appl. No.: 10/728,002

(22) Filed: Dec. 4, 2003

(65) Prior Publication Data
US 2004/0109689 A1 Jun. 10, 2004

(30) Foreign Application Priority Data
Dec. 4, 2002 (KR) .................. 10-2002-0076741

(51) Int. Cl.
*H04J 14/08* (2006.01)
*H04J 3/00* (2006.01)
(52) U.S. Cl. .................. 398/99; 370/437; 370/442; 370/461
(58) Field of Classification Search .............. 398/52, 398/58, 75, 98–99; 370/327, 347, 321
See application file for complete search history.

(56) References Cited
U.S. PATENT DOCUMENTS
6,804,256 B2 * 10/2004 Chang .................. 370/468
2003/0123482 A1 * 7/2003 Kim et al. .................. 370/468
2004/0202174 A1 * 10/2004 Kim et al. ............... 370/395.1

FOREIGN PATENT DOCUMENTS
JP 10-041964 2/1998
JP 11-122279 4/1999

OTHER PUBLICATIONS

O. Yoshihara et al.; "Dynamic Bandwidth Allocation Algorithm for GE-PON;" The Institute of Electronics, Information & Communication Engineers.
O. Yoshihara et al.; "Dynamic Bandwidth Allocation Algorithm for GE-PON;" The Institute of Electronics, Information & Communication Engineers; Apr. 2002.
GE-PON Grant/Request Method for High Bandwidth Efficiency and Low Latency, NTT Corp Mar. 2002, Institute of Electronics, p. 414.

* cited by examiner

*Primary Examiner*—Leslie Pascal
(74) *Attorney, Agent, or Firm*—Cha & Reiter, LLC (57) ABSTRACT

Disclosed is a bandwidth allocation method for an optical line termination (OLT) in a Gigabit Ethernet passive optical network (GE-PON) having one OLT and a plurality of optical network units (ONUs) connected to the OLT. The method includes the steps of transmitting a registration request grant message for granting an opportunity for transmitting a registration request signal from the OLT to the ONUs; determining the number of ONUs that transmitted registration request messages in response to the registration request grant message; and segmenting a single time slot into a plurality of minislots, segmenting a partial bandwidth of each of the segmented minislots so as to accommodate the ONUs, and allocating the segmented bandwidths to the ONUs that transmitted the registration request messages as voice bands.

8 Claims, 9 Drawing Sheets

METHOD FOR ALLOCATING BANDWIDTH FOR VOICE SERVICE IN A GIGABIT ETHERNET PASSIVE OPTICAL NETWORK

CLAIM OF PRIORITY

This application claims priority under 35 U.S.C. § 119 to an application entitled "Method for Allocating Bandwidth for Voice Service in a Gigabit Ethernet Passive Optical Network," filed in the Korean Intellectual Property Office on Dec. 4, 2002 and assigned Serial No. 2002-76741, the contents of which are incorporated herein by reference.

BACKGROUND OF THE INVENTION

1. Field of the Invention

The present invention relates generally to a method for dynamically allocating a bandwidth in a passive optical network, and in particular, to a method for allocating a bandwidth over which an optical line termination (OLT) transmits data to optical network units (ONUs) on the basis of a time axis in a Gigabit Ethernet passive optical network (GE-PON).

2. Description of the Related Art

In order to build a network of communications, various network structures, such as xDSL (x-Digital Subscriber Line), HFC (Hybrid Fiber Coax), FTTB (Fiber To The Building), FTTC (Fiber To The Curb) and FTTH (Fiber To The Home), and numerous evolution schemes have been proposed. Of the various network structures, FTTx (x=B, C, H) can be classified into an active FTTx implemented by an active optical network (AON) structure and a passive FTTx implemented by a passive optical network (PON) structure. Due to its network configuration of a point-to-multipoint topology using a passive element, the PON is preferred as it purports to provide an economical network.

In the PON, one optical line termination (OLT) is connected to a plurality of optical network units (ONUs) via a 1×N passive optical distribution network (ODN). In particular, the PON forms a tree-structured decentralized topology between the OLT and the ONUs.

For the PON, an asynchronous transfer mode passive optical network (ATM-PON) has been first developed and standardized. Recently, ITU-T (International Telecommunication Union-Telecommunication section) has published the standardization contents of the ATM-PON in ITU-T G.982, ITU-T G.983.1 and ITU-T G.983.3. In addition, IEEE802.3ah TF of IEEE (Institute of Electrical and Electronics Engineers) is conducting a standardization work on a Gigabit Ethernet passive optical network (GE-PON) system.

Medium access control (MAC) technology for the point-to-point Gigabit Ethernet and ATM-PON has already been standardized, and the contents thereof are disclosed in IEEE 802.3z and ITU-T G983.1. In addition, MAC technology in an ATM-PON is well disclosed in U.S. Pat. No. 5,973,374, issued on 2 Nov. 1999, entitled "Protocol for Data Communication over a Point-to-Multipoint Passive Optical Network," invented by Gigad Ghaib et al.

Figure 1:
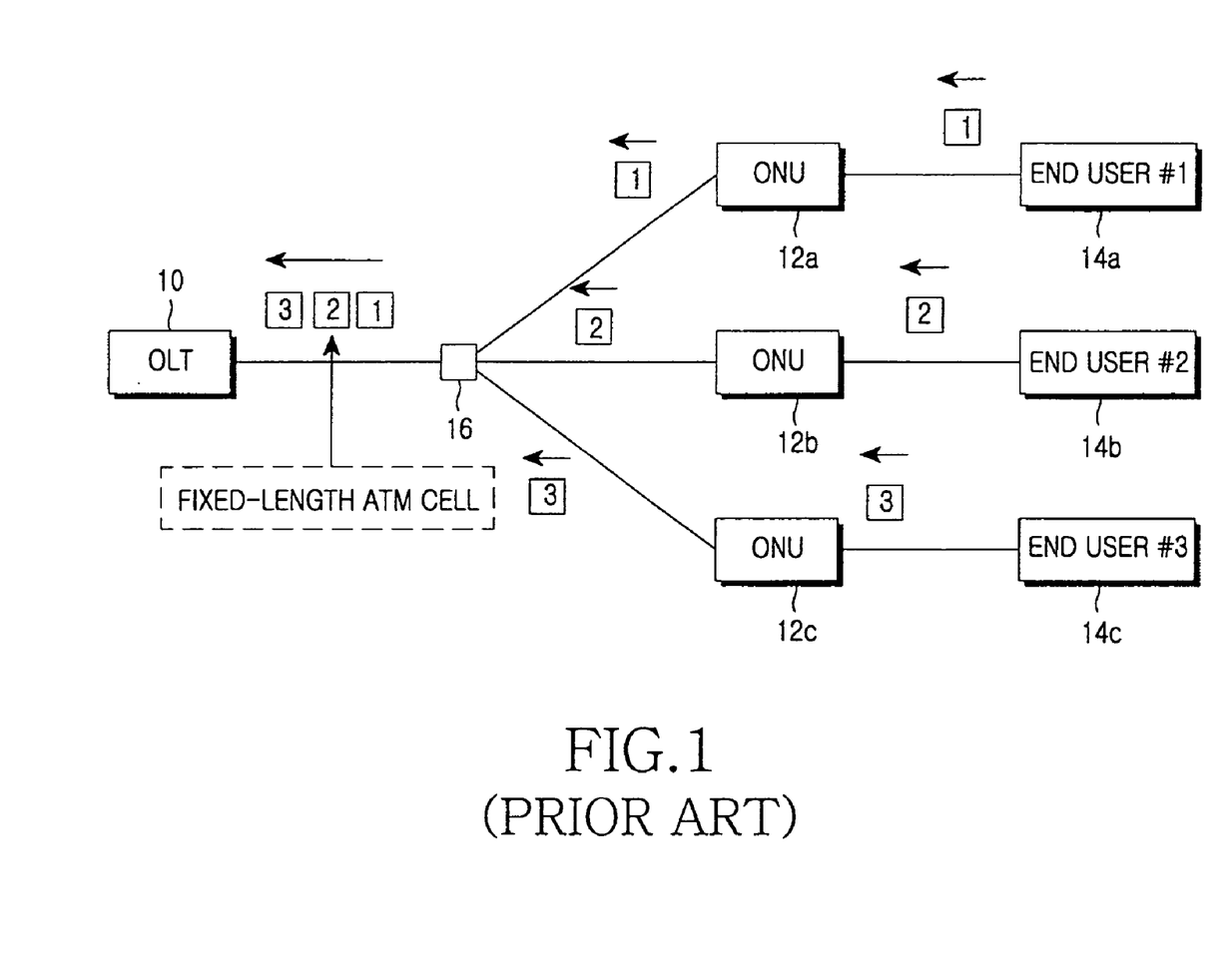
FIG. 1 is a block diagram illustrating an example of a common ATM-PON structure.

FIG. 1 is a block diagram illustrating an example of a common ATM-PON structure. As illustrated, an ATM-PON includes one OLT 10 and a plurality of ONUs 12a to 12c, wherein the OLT 10 is connected to the ONUs 12a to 12c via an ODN 16.

The OLT 10 plays a central role of providing information to the subscribers of an access network. The OLT 10 is connected to the ODN 16, which distributes a downstream data frame transmitted from the OLT 10 to the three ONUs 12a to 12c of the tree topology structure and transmits upstream data frames from the ONUs 12a to 12c to the OLT 10. The ONUs 12a to 12c receive the downstream data frame and provide the received downstream data frame to their end users 14a to 14c. Further, the ONUs 12a to 12c transmit upstream data frames output from the end users 14a to 14c to the OLT 10 via the ODN 16. The three end users 14a to 14c may be of different termination devices that can be used in a PON, including a network terminal (NT).

In the ATM-PON, data frames each consisting of 53-byte ATM cells are transmitted in upstream and downstream directions. In the tree-type PON structure of FIG. 1, during downstream transmission, the OLT 10 properly inserts downstream cells to be distributed to the ONUs 12a to 12c into a downstream frame. During upstream transmission, the OLT 10 accesses data transmitted from the ONUs 12a to 12c by time division multiplexing (TDM) scheme. Here, the ODN 16 connected between the OLT 10 and the ONUs 12a to 12c is a passive element.

The OLT 10 performs a virtual distance correction using a so-called ranging algorithm so as to prevent data from colliding in the ODN 16, which is a passive element. In addition, during downstream data transmission from the OLT 10 to the ONUs 12a to 12c, the OLT 10 exchanges encryption keys for security and OAM (Operations, Administration and Maintenance) messages with the ONUs 12a to 12c. To this end, upstream and downstream frames have a corresponding data field prepared in a dedicated ATM cell or a general ATM cell over which messages can be exchanged at stated periods.

Currently, with the development of Internet technology, subscribers require a wider bandwidth. Accordingly, research efforts have been focused on end-to-end transmission used in Gigabit Ethernet technology that is capable of securing a high bandwidth (of about 1 Gbps) at a relatively low price rather than in ATM technology, which requires high-priced equipments, segmentation of IP(Internet Protocol) packet, and only provides a limited bandwidth (of a maximum of 622 Mbps).

In the case of the Gigabit Ethernet, a MAC protocol of a point-to-point scheme and a collision scheme have already been standardized and a MAC controller chip is commercially available. However, in the case of a point-to-multipoint GE-PON structure, its overall scheduling procedure including MAC control is currently being standardized in IEEE 802.3ah EFM (Ethernet in the First Mile) TF.

The ATM-PON conducts a dynamic bandwidth allocation (DBA) for data transmission using the ONUs. In such an ATM-PON, the ONUs have four independent queues according to the service class defined by such parameters as VBR (Variable Bit Rate), CBR (Constant Bit Rate) and real-time feature. QoS (Quality of Service) is secured by storing data traffics applied to the ONUs in their queues and dynamically allocating a bandwidth considering the service class.

However, unlike the ATM, the GE-PON has an Ethernet-based protocol, so there is no service class. In the GE-PON based on Ethernet, a packet size is variable, so its bandwidth allocation method is distinguished from the bandwidth allocation method used in the ATM-PON in which a packet size is fixed. Accordingly, the GE-PON raises a bandwidth allocation scheduling problem since it is a PON having a point-to-multipoint structure, which has not been used yet in an Ethernet-based network.

Downstream traffic is broadcasted from the OLT to the ONUs, as done in the existing Ethernet. However, upstream traffics transmitted from the ONUs to the OLT are multiplexed before arriving at the OLT. In order to prevent traffic collision, the OLT must divide time so that the ONUs transmit data at a different time. Further, since the ONUs have different amounts of traffics to transmit, a dynamic bandwidth allocation is required in order to efficiently transmit the traffics to the OLT without time delay.

Figure 2:
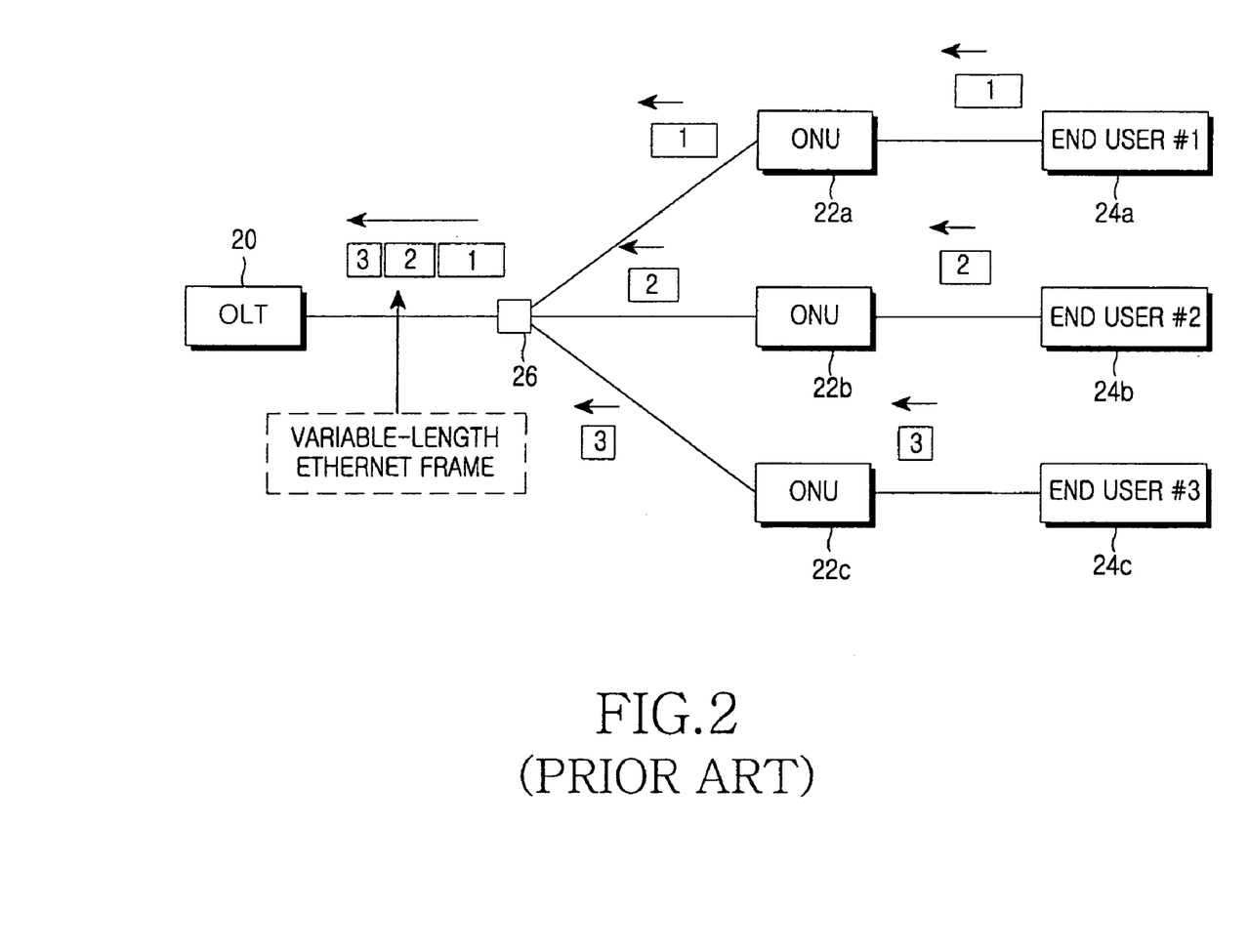
FIG. 2 is a block diagram illustrating an example of a GE-PON structure for dynamic bandwidth allocation.

FIG. 2 is a block diagram illustrating an example of a GE-PON structure capable of performing the dynamic bandwidth allocation. As illustrated, the GE-PON has an OLT 20 serving as a toll center, an ODN 26 consisting of an optical splitter that is a passive element, three ONUs 22a to 22c, and their associated end users 24a to 24c. Such a GE-PON employs TDM for the upstream transmission due to its point-to-multipoint tree structure.

The GE-PON, unlike the ATM-PON of FIG. 1, forms upstream and downstream frames based on a variable-length Ethernet frame for bandwidth allocation. A variable-length Ethernet frame format and GE-PON functions related to the variable-length Ethernet frame, i.e., initial ONU registration, late ONU registration, ranging and dynamic bandwidth allocation procedures, are disclosed in Korean patent application No. 2002-2765, filed by the applicant on 17 Jan. 2002, entitled "An Operation Implementation Method in a Gigabit Ethernet Passive Optical Network System and Ethernet Frame Structure Therefor."

The operation of the GE-PON illustrated in FIG. 2 will now be described in brief with reference to the Korean patent application No. 2002-2765. First, the ONUs 22a to 22c are registered in the OLT 20 to indicate their positions and existences. The ONUs are allocated their own unique IDs. Thereafter, a ranging, which is a distance correction procedure, is performed. Here, although the ONUs 22a to 22c can correct the synchronization error for the upstream/downstream time delay during the registration procedure, an error which may occur due to an external parameter, such as temperature, is not corrected accurately.

If the OLT 20 gives a data transmission opportunity to the ONUs 22a to 22c that have completed the ONU registration and the distance correction, through an upstream data transmission opportunity grant frame, then the ONUs 22a to 22c measure the amounts of data stored in their buffers, write the corresponding queue values in the band allocation request frames, and transmit the resultant band allocation request frames to the OLT 20. Here, the upstream data transmission opportunity grant frame is a downstream packet used when the OLT desires to give an upstream data transmission opportunity to one of the ONUs 22a to 22c, and the band allocation request frame is an upstream packet used when one of the ONUs 22a to 22c, granted by the OLT 20, sends a band allocation request to the OLT 20.

After receiving the bandwidth allocation requests for a particular time within one time slot, the OLT 20 allocates an appropriate data transmission bandwidth through scheduling. Here, allocation information of the data transmission bandwidth is comprised of a data transmission start time and a data transmission holding time. After the allocation of the data transmission bandwidth, the ONUs 22a to 22c transmit data to the OLT 20 at an allocated transmission start time during an allocated transmission holding time.

Figure 3:
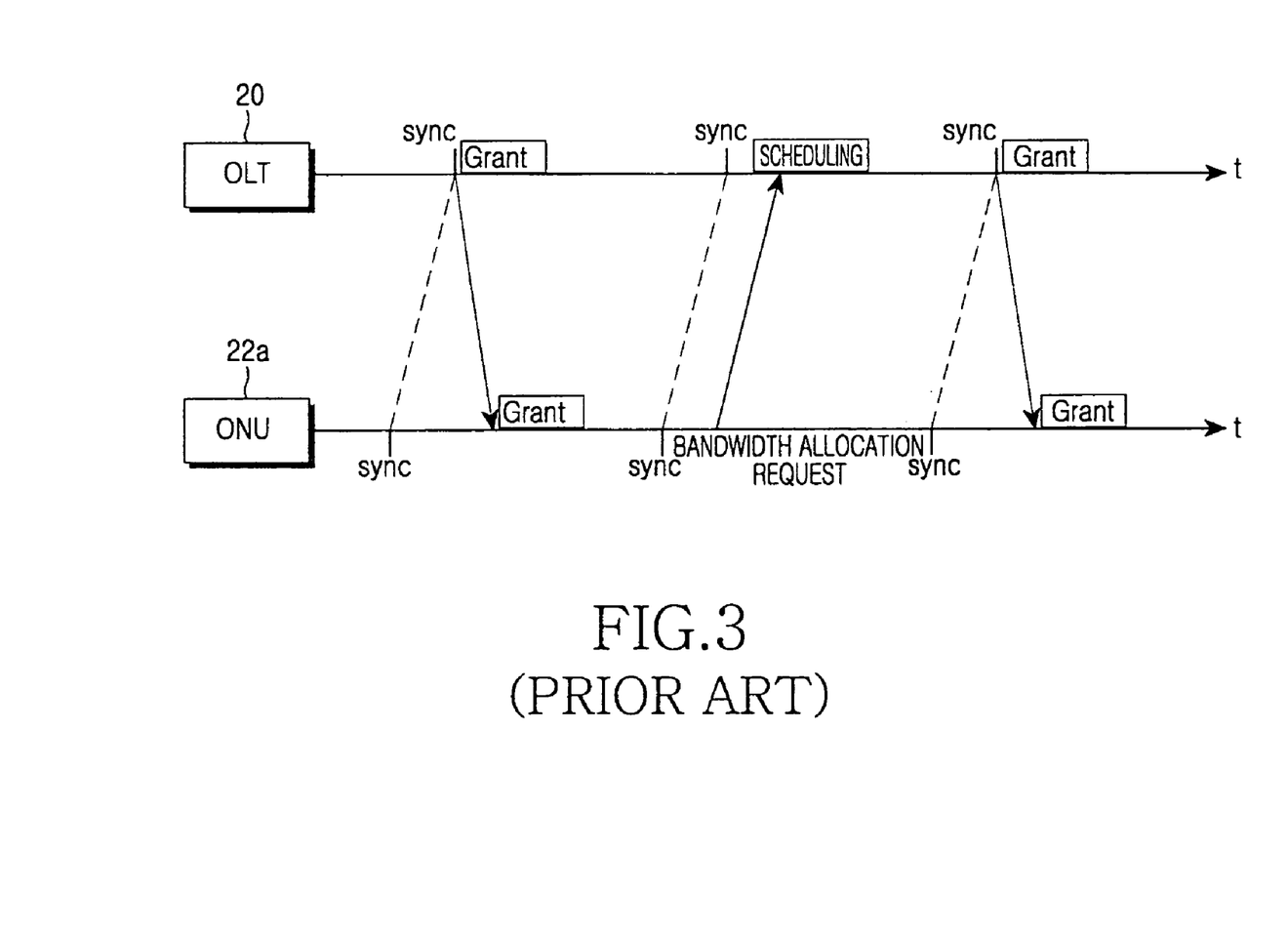
FIG. 3 is a diagram illustrating an example of a bandwidth allocation method performed by the OLT of FIG. 2.

FIG. 3 is a diagram illustrating an example of a bandwidth allocation method performed by the OLT 20 of FIG. 2. Here, the bandwidth allocation between the OLT 20 and one ONU 22a among the ONUs 22a to 22c will be described.

After matching the synchronization with the ONU 22a, the OLT 20 transmits a transmission opportunity grant frame GRANT to the ONU 22a. As a result, the ONU 22a has an opportunity to transmit a request signal to the OLT 20. Therefore, when data transmission request is needed, the ONU 22a sends a bandwidth allocation request to the OLT 20 after matching the synchronization with the OLT 20. Upon receiving the bandwidth allocation request from the ONU 22a, the OLT 20 performs a scheduling for the bandwidth allocation to the ONU 22a.

Thereafter, the OLT 20 allocates a data transmission bandwidth to the ONU 22a according to the scheduling result. After being allocated a data transmission bandwidth, the ONU 22a transmits data to the OLT 20 for a time allocated according to the allocated data transmission bandwidth.

The future standardization is expected to be developed in a direction of determining details of SLA (Service Level Agreement) and MPCP (Multi-Point Control Protocol) given that the PON is one of basic solutions for FTTH. However, no SLA procedure has been defined yet in IEEE802.3, like the existing LAN (Local Area Network) protocol.

However, according to ITU-T G.983.2, ATM-PON management specification defines several options in separating characteristics for a plurality of service class traffics without distinguishing voice data and in managing the traffics. Accordingly, from the requirement for the GE-PON, it is indicated that several multimedia services having the existing data transmission network will be performed in the Ethernet. The GE-PON requirements include a video broadcast streaming and audio broadcast streaming service as a downstream broadcasting service. In addition, the GE-PON requires a dynamic bandwidth allocation capable of accepting the characteristic of busty traffic and the acceptance of a real-time video/audio service.

However, in the existing LAN environment, particularly, in an Ethernet-based network, a CSMA/CD (Carrier Sense Multiple Access/Collision Detect) scheme is basically serviced, but the operation or measure for the quality of service is not reflected in a protocol. Given that a transfer rate of the Ethernet exceeds a Giga class and a MAC operation is no longer requires a more CSMA/CD operation, it can be understood that acceptance of various services for the GE-PON has an important meaning to a GE-PON protocol.

Meanwhile, one of the most fundamental services that the GE-PON must accept as an FTTx solution is a voice service. For the voice service, a short latency time and a low jitter noise are required during transmission.

A period for which the OLT 20 performs scheduling for bandwidth allocation to the ONU 22a is called a "time slot," and according to GR-909, a maximum value of the time slot is defined as 2 msec in a FITL (Fiber In The Loop) system. Accordingly, when voice data having a latency time characteristic is managed in the same queue like the other VBR service, since a basic transmission time exceeds 2 msec even on the assumption that a dynamic bandwidth allocation algorithm allocates a bandwidth by giving a priority to the transmission of voice data for a voice service, the conventional dynamic bandwidth algorithm cannot accept the voice service when the size of a time slot is 2 msec.

SUMMARY OF THE INVENTION

It is, therefore, an object of the present invention to provide a bandwidth allocation method for a GE-PON, capable of providing a voice service within a preset transmission latency time.

It is another object of the present invention to provide a bandwidth allocation method for a GE-PON, capable of efficiently using an allocated bandwidth while providing a voice service within a preset latency time.

In one embodiment, a bandwidth allocation method for an optical line termination (OLT) in a Gigabit Ethernet passive optical network (GE-PON) having one OLT and a plurality of optical network units (ONUs) connected to the OLT is provided. The method includes the steps of: a) transmitting a registration request grant message for granting an opportunity for transmitting a registration request signal from the OLT to the ONUs; b) determining the number of ONUs that has transmitted registration request messages in response to the registration request grant message; and c) segmenting one time slot into a plurality of minislots, segmenting a partial bandwidth of each of the segmented minislots so as to accommodate the ONUs, and allocating the segmented bandwidths to the ONUs that transmitted the registration request messages as voice bands. Preferably, in the step c), one time slot is segmented into a plurality of minislots having the same bandwidth. In addition, in the step c), a partial bandwidth of each of the segmented minislots is segmented into a predetermined number of bands, the predetermined number being identical to the number of the ONUs.

Preferably, the voice bands allocated to the ONUs have the same bandwidth.

Preferably, the bandwidth allocation method further comprises the steps of: transmitting a band request grant message for granting an opportunity for transmitting a band allocation request signal for data transmission, from the OLT to the ONUs; receiving band allocation request signals from the ONUs in response to the band request grant message; and dynamically allocating data transmission bands to the ONUs that transmitted the band allocation request signals by performing scheduling for the bandwidth allocation according to the band allocation request signals transmitted by the ONUs during the remaining bandwidths, excluding the allocated voice bands from each minislot.

The bandwidth allocation method further comprises the step of dynamically allocating, up receiving the band allocation request signals from the ONUs, the data transmission bands to the ONUs that transmitted the band allocation request signals by performing scheduling for bandwidth allocation on one time slot excluding the allocated voice bands according to the band allocation request signals transmitted from the ONUs.

Preferably, the time slot has a bandwidth of a maximum of 2 msec, and the minislot has a bandwidth of a maximum of 0.5 msec.

According to the present invention, the OLT can reduce the occurrence of an output synchronization error due to the transmission and reception delay of voice data by allocating fixed-length voice transmission bands so as to first transmit voice data for a voice service before transmitting data. In addition, the OLT can easily provide a voice service and efficiently use an allocated bandwidth by allocating fixed-length voice transmission bands to the ONUs connected thereto and allocating data transmission bands having a variable bandwidth according to an amount of transmission data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. For the purposes of clarity and simplicity, a detailed description of known functions and configurations incorporated herein has been omitted.

To assist in the understanding of the present invention, a band allocation request frame format proposed in IEEE 802.3ah TF will be described in brief with reference to FIG. 4.

Figure 4:
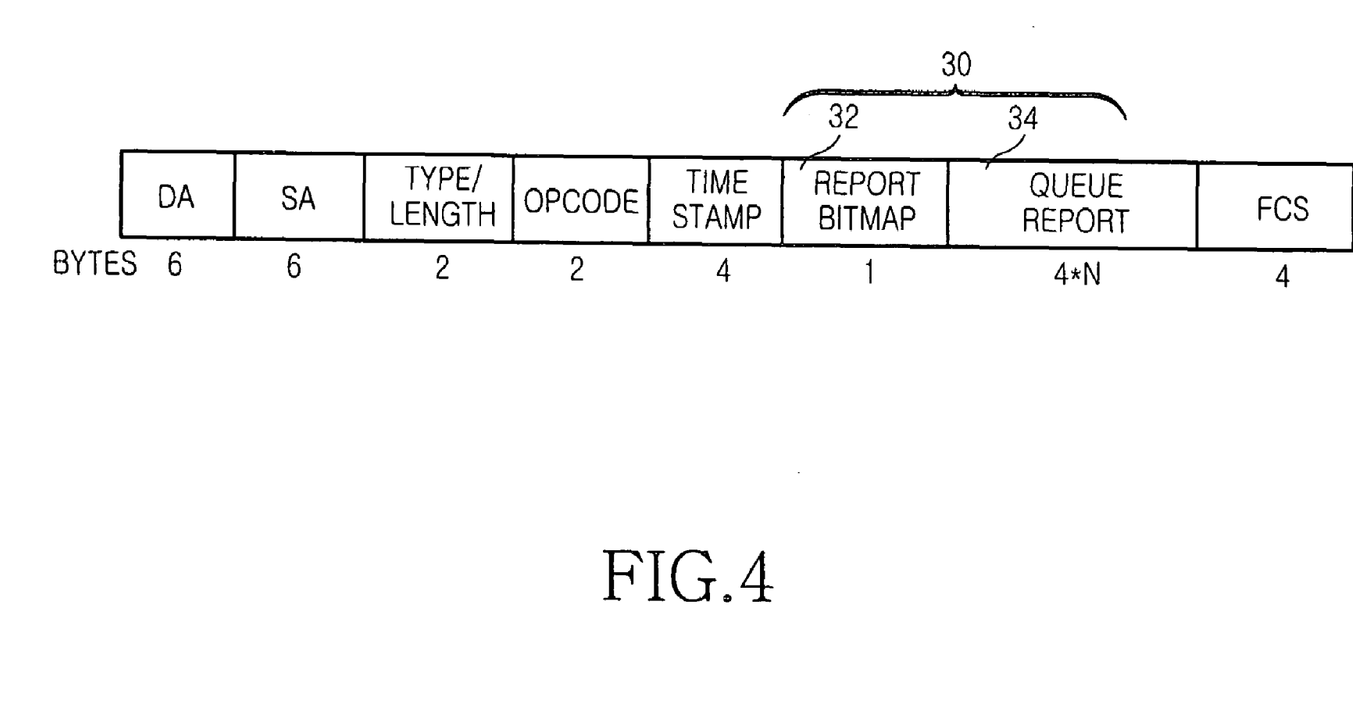
FIG. 4 is a diagram illustrating a band allocation request frame format proposed in IEEE 802.3ah TF.

FIG. 4 is a diagram illustrating a band allocation request frame format proposed in IEEE 802.3ah TF. As illustrated, the band allocation request frame format has DA (Destination Address), SA (Source Address), TYPE/LENGTH, OPCODE (Operation Code), TIME STAMP, REPORT BITMAP, QUEUE REPORT, and FCS (Frame Check Sequence) fields. The 6-byte DA field records a destination address, and the 6-byte SA field records a source address. The 2-byte TYPE/LENGTH field records a type (control frame or data frame) and length of a frame, and the 2-byte OPCODE field records a control information for distinguishing a message type of a control frame. The 4-byte TIME STAMP field records a time when a frame message is transmitted, and the 1-byte REPORT BITMAP field 32 and the 4*N-byte QUEUE REPORT field 34 (where N is the number of queues that requested a bandwidth) constitute a bandwidth request field 30 for requesting a bandwidth. Here, the REPORT BITMAP field 32 records the existence/non-existence of the bandwidth requested-queue data according to the queue priority report, and the EUQUE REPORT field 34 records a requested bandwidth size according to the queue priority report indicated by the REPORT BITMAP field 32. The 4-byte FCS field records an information for checking an error of a frame check sequence.

Dividing the bandwidth request field 30 for the bandwidth request into the REPORT BITMAP field 32 and the QUEUE REPORT field 34 as illustrated in FIG. 4 in order to secure QoS (Quality of Service) and CoS (Class of Service) in the GE-PON is currently being discussed in IEEE 802.3ah TF.

Securing QoS and CoS is optional according to a system type and a service type when a vendor actually designs the system. The vendor can request a bandwidth by determining the priorities of a minimum of 1 queue report (no priority) to a maximum of 8 queue reports (a maximum of 8 priorities). For example, when a bandwidth is requested with one queue report, each of ONUs includes one queue, and when a bandwidth is requested with 8 queue reports, each of the ONUs includes 8 queues.

Figure 5:
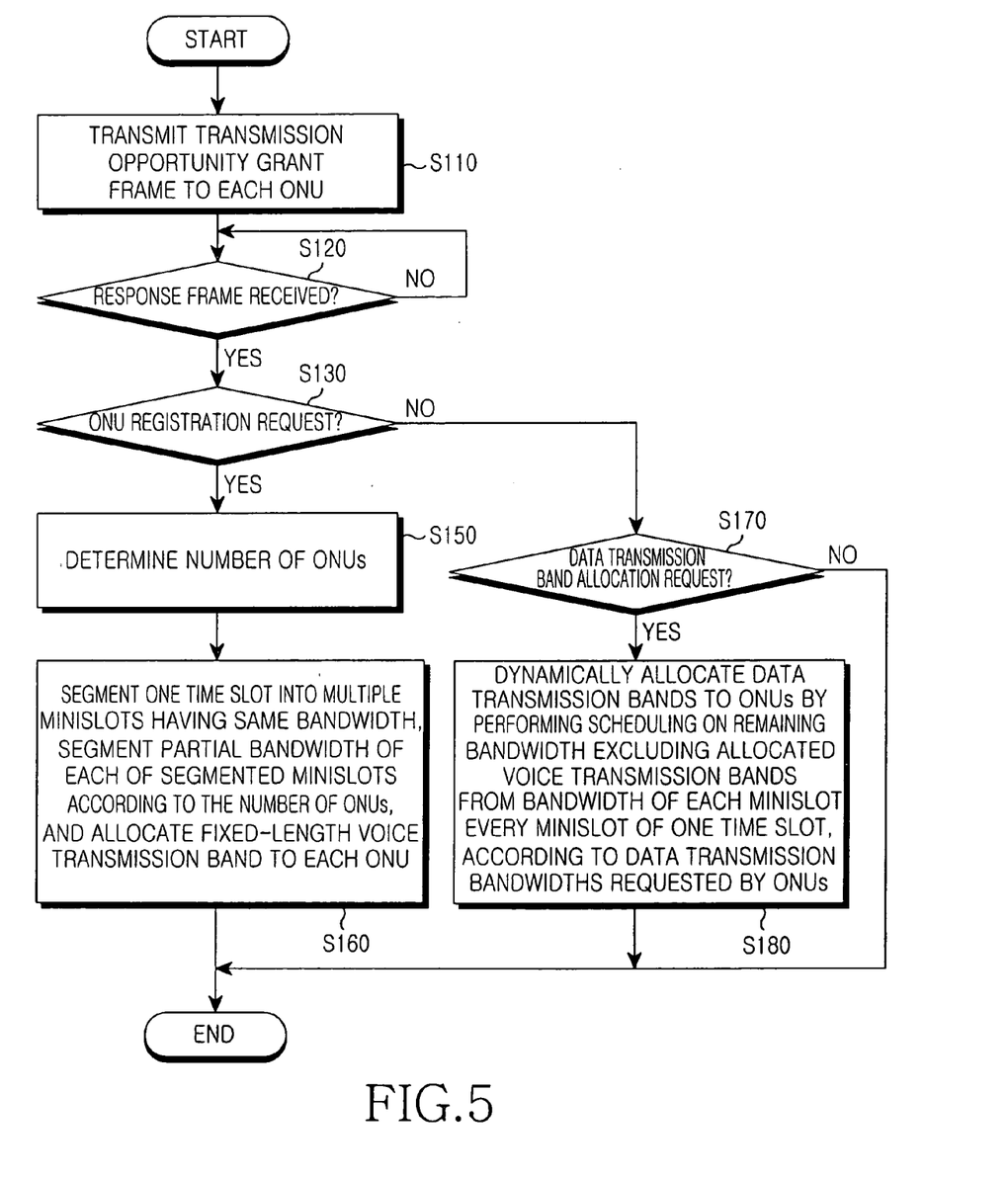
FIG. 5 is a flowchart illustrating a bandwidth allocation method of a GE-PON for a voice service according to a first embodiment of the present invention.

FIG. 5 is a flowchart illustrating a bandwidth allocation method for a GE-PON capable of accepting a voice service according to a first embodiment of the present invention. The GE-PON to which the present invention is applied has the same network configuration as the GE-PON illustrated in FIG. 2. Therefore, the invention will be described with reference to the GE-PON illustrated in FIG. 2.

Referring to FIG. 5, an OLT 20 transmits a transmission opportunity grant frame GRANT to respective ONUs 22a to 22c after setting up synchronization (Step S110). Upon receiving the transmission opportunity grant frame GRANT, the ONUs 22a to 22c transmit a response frame to the OLT 20 in acknowledgement. The response frame includes request information transmitted from the ONUs 22a to 22c to the OLT 20. In this embodiment, the request information included in the response frame is any one of a registration request for registration of the ONUs 22a to 22c and a data transmission band allocation request for data transmission.

The OLT 20 determines whether a response frame transmitted from the ONUs 22a to 22c has been received (Step S120). If it is determined that a response frame has been received, the OLT 20 determines whether the received response frame is an ONU registration request (Step S130). If it is determined that the received response frame is an ONU registration request of the ONUs 22a to 22c, the OLT 20 determines the number of ONUs 22a to 22c that transmitted the response frame (Step S150).

After determining the number of ONUs 22a to 22c, the OLT 20 segments one time slot into a plurality of minislots G having the same bandwidth, segments a partial bandwidth of the segmented minislots G according to the number of the ONUs 22a to 22c, and allocates a fixed-length voice transmission band to each of the ONUs 22a to 22c (Step S160). Here, the allocated fixed-length voice transmission bands have the same bandwidth according to the number of ONUs that requested bandwidth allocation. In this embodiment, the time slot has a bandwidth of 2 msec and the minislots G have a bandwidth of 0.5 msec.

However, if it is determined in step S130 that the received response frame is not an ONU registration request, the OLT 20 determines whether the received response frame is a data transmission band allocation request (Step S170). If it is determined that the received response frame is a data transmission band allocation request, the OLT 20 dynamically allocates data transmission bands to the ONUs 22a to 22c by performing scheduling on the remaining bandwidth, excluding the allocated voice transmission bands from the bandwidth of each minislot on every minislot G of one time slot, according to data transmission bandwidths requested by the ONUs 22a to 22c (Step S180).

Here, the data transmission band is allocated to a bandwidth excluding the allocated voice transmission bands from the 0.5 msec minislot. That is, the OLT 20 allocates a bandwidth excluding the voice transmission bands allocated within 0.5 msec, to each of the ONUs 22a to 22c that requested the allocation of a data transmission band.

Figure 6:
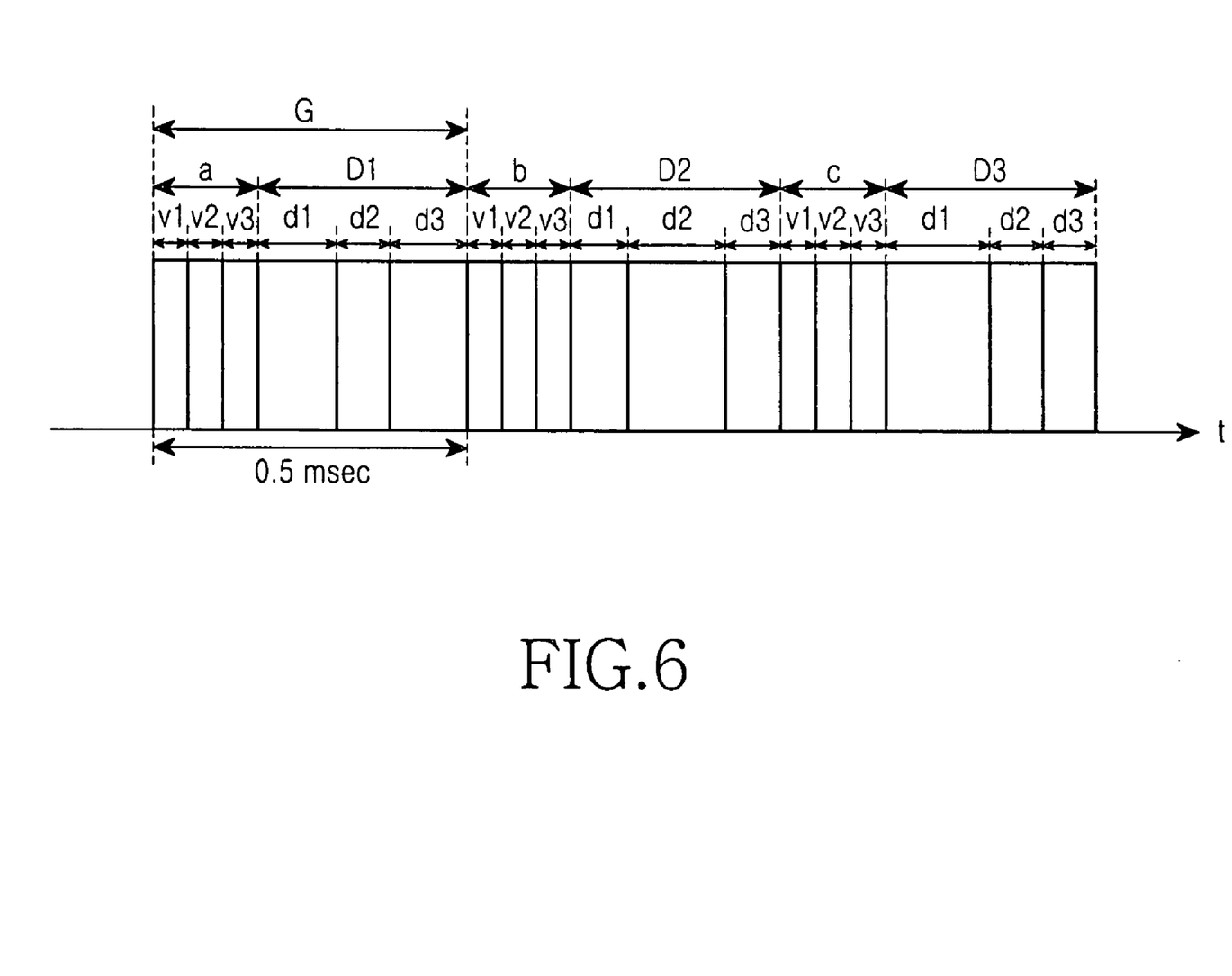
FIG. 6 is a diagram illustrating an example of the bandwidths allocated by the bandwidth allocation method of FIG. 5.

FIG. 6 is a diagram illustrating an example of the bandwidths allocated using the bandwidth allocation method described in FIG. 5. In the figure, voice transmission bands are indicated by 'a', 'b' and 'c'. 'D1', 'D2' and 'D3' indicate the data transmission allocated by the OLT 20 when the ONUs 22a to 22c transmit a bandwidth allocation request signal.

According to IEEE802.3ah Draft version 1.0, it is provided that the OLT 20 can support up to 4 gate message bands (referred as minislots G in this specification). For example, in FIG. 6, a first minislot G includes a voice transmission bandwidth 'a' and a data transmission bandwidth 'D1' allocated through one scheduling. Therefore, in this embodiment, since a maximum value of one time slot is 2 msec, one gate message band (i.e., one minislot bandwidth) is 0.5 msec. The bandwidth of the minislot G is called a maximum latency time for the transmission of voice data.

As illustrated, a minislot G is set to 0.5 msec. The OLT 20 allocates voice transmission bands v1, v2 and v3 to the ONUs 22a to 22c connected thereto, respectively, at regular intervals of 0.5 msec. The voice transmission bands v1, v2 and v3 allocated in this way are known as the entire voice transmission bands 'a', 'b' and 'c' of the ONUs 22a to 22c.

Therefore, the OLT 20 can simply perform the scheduling during the data transmission band allocation for data transmission by first allocating fixed-length voice transmission bands for a voice service at regular intervals according to the number of ONUs connected to the OLT 20 and then by allocating bands excluding the allocated voice transmission bands when data transmission is required. In addition, the OLT 20 can reduce the waste of bandwidth allocation due to the separation of voice transmission bands and data transmission bands according to the ONUs 22a to 22c, by allocating voice transmission bands v1, v2 and v3 and data transmission bands d1, d2 and d3 for the ONUs 22a to 22c within one minislot G.

Figure 7:
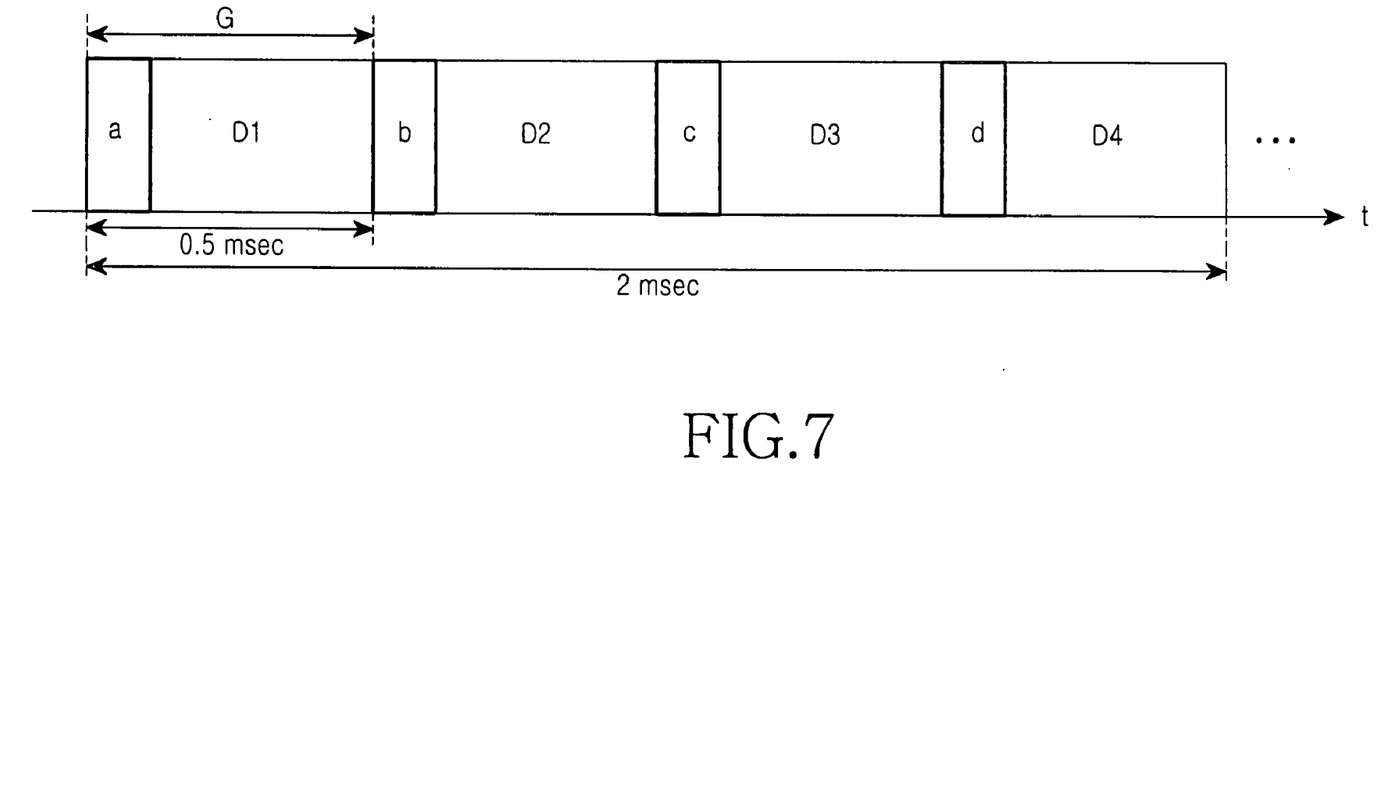
FIG. 7 is a simplified diagram illustrating voice transmission bands and data transmission bands allocated to ONUs in FIG. 6.

FIG. 7 is a simplified diagram illustrating voice transmission bands 'a', 'b' and 'c' and data transmission bands 'D1', 'D2' and 'D3' of FIG. 6. In the drawing, for example, the number of ONUs is 4. In the embodiment of the present invention, a period of a time slot is set to 2 msec, and the time slot is divided into 4 minislots G each having a bandwidth of 0.5 msec. Each of the voice transmission bands 'a', 'b', 'c' and 'd' is allocated from the start slot of the corresponding minislot. Data transmission bands for the 4 ONUs are allocated between the voice transmission bands 'a', 'b', 'c' and 'd'. Such scheduling is repeatedly performed by the OLT 20 every minislot period by receiving a response frame from the ONUs.

Therefore, the OLT 20 can reduce the occurrence of an output synchronization error due to transmission and reception delay of voice data by allocating fixed-length voice transmission bands to the ONUs so as to transmit voice data for a voice service before transmitting data.

Note that according to an embodiment of the present invention, the OLT 20 must perform scheduling four times for 2 msec, and each of the ONUs must also transmit a service class queue including data traffic to the OLT 20 four times. Accordingly, the present invention provides another embodiment capable of improving the bandwidth allocation, as explained hereinafter.

Figure 8:
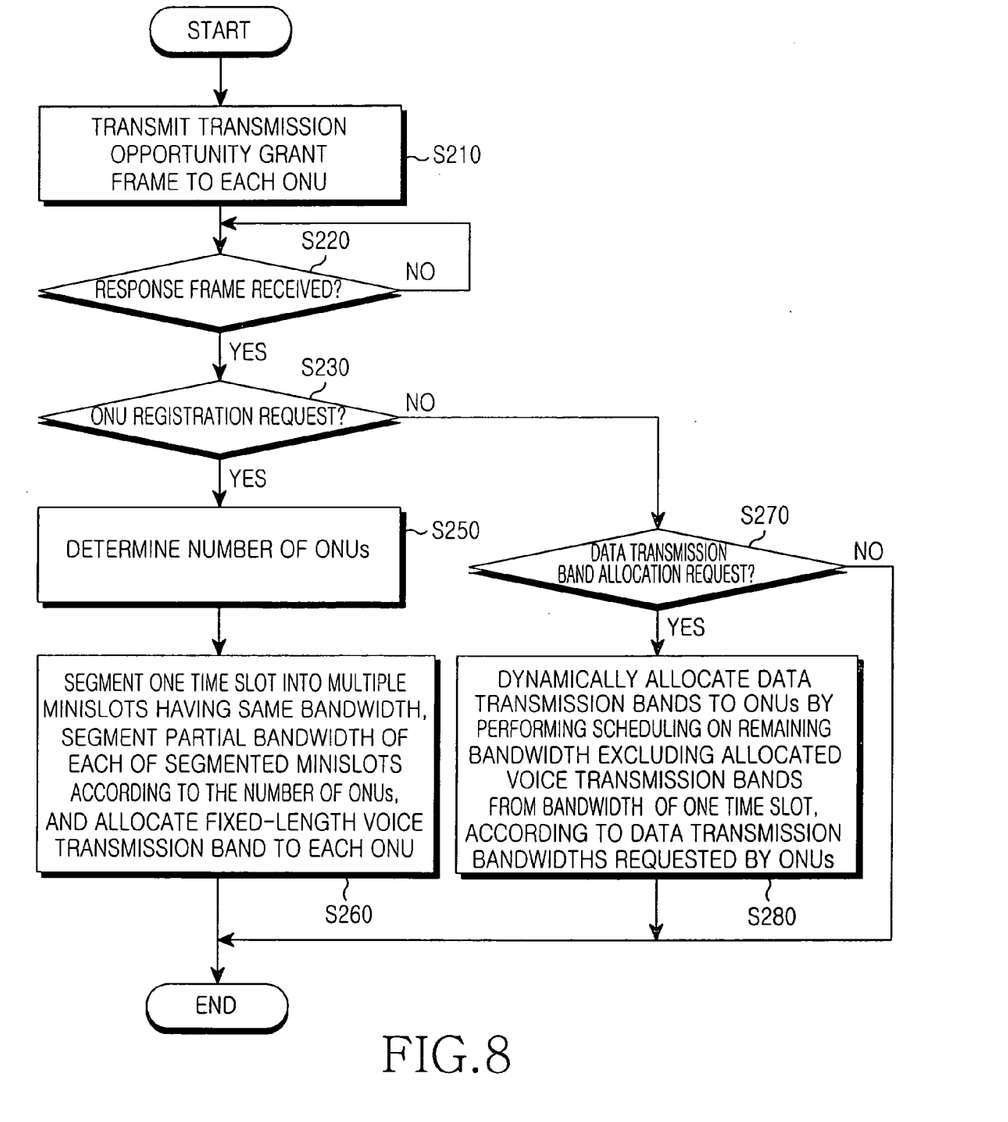
FIG. 8 is a flowchart illustrating a bandwidth allocation method of a GE-PON for a voice service according to a second embodiment of the present invention.

FIG. 8 is a flowchart illustrating a bandwidth allocation method for a GE-PON capable of accepting a voice service according to a second embodiment of the present invention. In the drawing, steps S210 to S270 are identical to the steps S110 to S170 of FIG. 5, so a detailed description thereof will be omitted herein for simplicity.

If it is determined in step S270 that a received response frame is a data transmission band allocation request, the OLT 20 dynamically allocates data transmission bands to the ONUs by performing scheduling on the remaining bandwidth, excluding the allocated voice transmission bands from the bandwidth of one time slot, according to a data transmission bandwidth requested by the ONUs (Step S280). Accordingly, it can be understood that the data transmission bands are variably allocated according to an amount of transmission data of the ONUs. Therefore, the data transmission band can be longer or shorter than a bandwidth determined by excluding the voice transmission band from the minislot G.

Therefore, the OLT 20 can easily provide a voice service and efficiently use an allocated bandwidth by allocating fixed-length voice transmission bands according to the number of ONUs and variably allocating data transmission bands according to an amount of transmission data.

Figure 9:
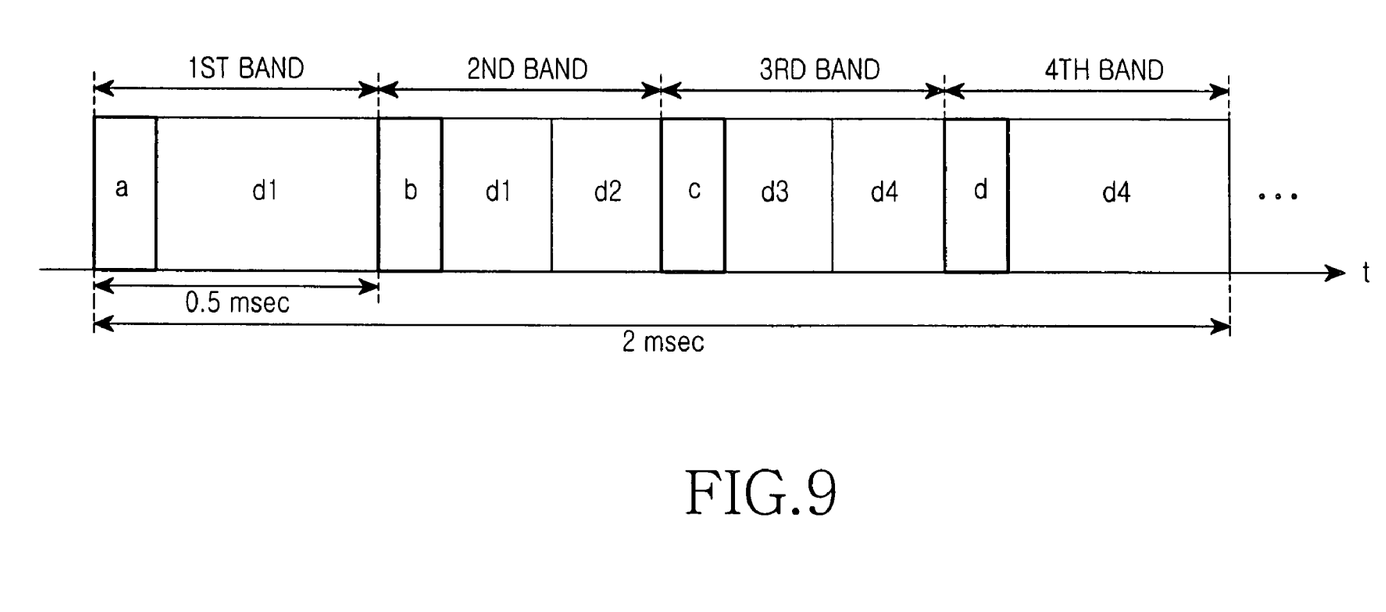
FIG. 9 is a diagram illustrating an example of the bandwidths allocated by the bandwidth allocation method of FIG. 8.

FIG. 9 is a diagram illustrating an example of bandwidths allocated by the bandwidth allocation method of FIG. 8. In the drawing, for example, the number of ONUs is 4. As illustrated, voice transmission bands for the 4 ONUs are allocated for voice transmission bands 'a', 'b', 'c' and 'd', respectively. In addition, a 2 msec time slot is segmented into 4 minislots each having a bandwidth of 0.5 msec. In this embodiment, the 4 minislots are called a first band, a second band, a third band and a fourth band. Here, voice transmission bands for the ONUs are allocated for the voice transmission bands 'a', 'b', 'c' and 'd', respectively.

Meanwhile, it can be understood that the data transmission bands 'd1', 'd2', 'd3' and 'd4' are variably allocated to the ONUs according to the amounts of transmission data of the ONUs. As illustrated, the entire band of the first band and a partial band of the second band are allocated for the data transmission band 'd1' allocated to the first ONU, and a partial band of the second band is allocated for the data transmission band 'd2' allocated to the second ONU. In addition, a partial band of the third band is allocated for the data transmission band 'd3' allocated to the third ONU, and a partial band of the third band and the entire band of the fourth band are allocated for the data transmission band 'd4' allocated to the fourth ONU.

As can be appreciated from the foregoing description, the OLT can reduce the occurrence of an output synchronization error due to transmission and reception delay of voice data by allocating fixed-length voice transmission bands so as to first transmit voice data for a voice service before transmitting data. In addition, the OLT can easily provide a voice service and efficiently use an allocated bandwidth by allocating fixed-length voice transmission bands to the ONUs connected thereto and allocating data transmission bands having a variable bandwidth according to an amount of transmission data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A bandwidth allocation method for an optical line termination (OLT) in a Gigabit Ethernet passive optical network (GE-PON) having one OLT and a plurality of optical network units (ONUs) coupled to the OLT, the method comprising the steps of:
   a) transmitting a registration request grant message for granting an opportunity for transmitting a registration request signal from the OLT to the ONUs in a GE-PON band allocation request frame;
   b) determining the number of ONUs that transmitted registration request messages in response to the registration request grant message in the GE-PON band allocation request frame; and
   c) segmenting a single time slot into a plurality of minislots, segmenting a partial bandwidth of each of the segmented minislots so as to accommodate the ONUs, and allocating the segmented bandwidths to the ONUs that transmitted the registration request messages as voice bands in the GE-PON band allocation request frame.

2. The bandwidth allocation method of claim 1, wherein the voice bands allocated to the ONUs have the same bandwidth.

3. The bandwidth allocation method of claim 1, further comprising the steps of:
   transmitting a band request grant message for granting an opportunity for transmitting a band allocation request signal for data transmission from the OLT to the ONUs;
   receiving band allocation request signals from the ONUs in response to the band request grant message; and
   dynamically allocating data transmission bands to the ONUs that transmitted the band allocation request signals by performing scheduling for bandwidth allocation according to the band allocation request signals transmitted by the ONUs on every remaining bandwidths excluding the allocated voice bands from each minislot.

4. The bandwidth allocation method of claim 3, further comprising the step of dynamically allocating, upon receiving the band allocation request signals from the ONUs, the data transmission bands to the ONUs that transmitted the band allocation request signals by performing scheduling for bandwidth allocation on a single time slot excluding the allocated voice bands.

5. The bandwidth allocation method of claim 1, wherein the time slot has a bandwidth of a maximum of 2 msec.

6. The bandwidth allocation method of claim 1, wherein the minislot has a bandwidth of a maximum of 0.5 msec.

7. The bandwidth allocation method of claim 1, wherein in the step c), the single time slot is segmented into a plurality of minislots having the same bandwidth.

8. The bandwidth allocation method of claim 1, wherein in the step c), a partial bandwidth of each of the segmented minislots is segmented into a predetermined number of bands, the predetermined number being identical to the number of the ONUs.

* * * * *